Patented May 28, 1940

2,202,647

UNITED STATES PATENT OFFICE 2,202,647

MANUFACTURE OF LEAD STYPHNATE

Willi Brun, Bridgeport, Conn., assignor to Remington Arms Company, Inc., a corporation of Delaware No Drawing. Application November 26, 1937, Serial No. 176,629

5 Claims. (Cl. 260—435)

This invention relates to the manufacture of the lead salts of styphnic acid. These lead salts, especially the normal salt, find extensive use in the explosives industry, being specially desired as ingredients of ammunition priming mixtures. In the patent to Herz, No. 1,443,328, there is disclosed a method for the preparation of the normal lead salt of styphnic acid from the more soluble alkali metal or alkali earth metal salts, particularly the sodium salt. Preparation of the lead salt in this way presents substantial technical difficulty due to the relatively slight solubility of even the sodium salts, the other salts of this class being still less soluble. In the patent to Herz, No. 1,999,728, a method is disclosed which involves the use of the magnesium salt.

Prior to the present invention, no other soluble styphnic acid salts have been known or known to be available and suitable for the manufacture of such relatively insoluble salts as the lead salts. It has now being discovered that soluble styphnates of several metals can be prepared and utilized to substantial advantage in the preparation of lead and other relatively insoluble styphnates. Among such soluble salts may be mentioned those of cadmium, zinc, manganese, iron, cobalt and nickel. Solutions of the styphnates of any of these metals may be prepared by the method of dissolving together the requisite amounts of styphnic acid and the oxide or carbonate of the metal, and filtering off the solid residues. From the resulting solution of a soluble styphnate, which may be stored in the usual manner, lead styphnate can be made by the method of slowly adding to the solution of the soluble styphnate a solution of a soluble lead salt, for example, lead nitrate. If the styphnic acid used is of the requisite purity, the lead styphnate is precipitated in crystals of a form and size suitable for use as the explosive ingredient of ammunition priming mixtures.

Specific examples of the preparation of soluble styphnates of the group above mentioned and of the making of lead styphnate therefrom are as follows:

EXAMPLE 1.—*Manufacture from Zinc Styphnate*

72 grams of styphnic acid and 24 grams of zinc oxide are dissolved in about 200 c. c. of water. This solution is filtered, and diluted by the addition of 700 c. c. (more or less) of water to a specific gravity of 1.04. An acidity determination is made and the acidity adjusted to the point at which 100 c. c. of the 1.04 specific gravity solution diluted with 250 c. c. of water is neutralized by 6 to 8 c. c. of a one-half normal solution of sodium hydroxide.

240 c. c. of the zinc styphnate solution thus prepared is precipitated with 80 c. c. of 30% lead nitrate solution, the temperature of the solutions being preferably about 60° or 65° C. This results in a yield of about 17.5 grams of crystalline lead styphnate, which may be recovered by filtration and washing in the usual manner.

EXAMPLE 2.—*Manufacture from Manganous Styphnate*

34 grams of manganous carbonate and 72 grams of styphnic acid are dissolved in 200 c. c. of water. The solution is filtered and diluted to a specific gravity of about 1.04. Acidity is adjusted, as described in conjunction with the preparation of the zinc styphnate solution.

240 c. c. of the manganous styphnate solution thus prepared is precipitated with 80 c. c. of 30% lead nitrate solution, preferably at a temperature of about 60° to 65° C. The precipitate of about 15.8 grams of normal lead styphnate may be recovered by filtering and washing.

This application is a continuation-in-part of this inventor's prior co-pending application, Serial No. 35,063, filed on August 7, 1935.

What is claimed is:

1. The method of making lead styphnate, which comprises the precipitation thereof by the addition of an approximately 30% solution of lead nitrate to a solution having a specific gravity of about 1.04 of a soluble styphnate selected from the group consisting of the styphnates of cadmium, zinc, manganese, iron, cobalt and nickel, said lead nitrate solution and soluble styphnate solution being in the proportions of about 80 cc. of lead nitrate solution to 240 cc. of soluble styphnate solution.

2. The method of making lead styphnate, which comprises the precipitation thereof by the addition of an approximately 30% solution of lead nitrate to a solution having a specific gravity of about 1.04 of a soluble styphnate selected from the group consisting of the styphnates of cadmium, zinc, manganese, iron, cobalt and nickel, said lead nitrate solution and soluble styphnate solution being in the proportions of about 80 cc. of lead nitrate solution to 240 cc. of soluble styphnate solution, and the reacting solutions being at a temperature of about 60° C.

3. The method of making lead styphnate, which comprises the precipitation thereof by the addition of an approximately 30% solution of lead nitrate to a solution of nickel styphnate having a specific gravity of about 1.04, said reacting solutions being in the proportions of about 80 cc. of lead nitrate solution to 240 cc. of nickel styphnate solution.

4. The method of making lead styphnate, which comprises the precipitation thereof by the addition of an approximately 30% solution of lead nitrate to a solution of zinc styphnate having a specific gravity of about 1.04, said reacting solutions being in the proportions of about 80 cc. of lead nitrate solution to 240 cc. of zinc styphnate solution.

5. The method of making lead styphnate, which comprises the precipitation thereof by the addition of an approximately 30% solution of lead nitrate to a solution of manganese styphnate having a specific gravity of about 1.04, said reacting solutions being in the proportions of about 80 cc. of lead nitrate solution to 240 cc. of manganese styphnate.

WILLI BRUN.